US012644951B2

(12) United States Patent
Han

(10) Patent No.: US 12,644,951 B2
(45) Date of Patent: Jun. 2, 2026

(54) LOCATING METHOD AND APPARATUS, ELECTRONIC DEVICE, AND STORAGE MEDIUM

(71) Applicant: BEIJING XIAOMI MOBILE SOFTWARE CO., LTD., Beijing (CN)

(72) Inventor: Yu Han, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 439 days.

(21) Appl. No.: 18/201,745

(22) Filed: May 24, 2023

(65) Prior Publication Data

US 2024/0219506 A1 Jul. 4, 2024

(30) Foreign Application Priority Data

Jan. 3, 2023 (CN) .......................... 202310004853.1

(51) Int. Cl.
*H04W 24/00* (2009.01)
*G01S 5/00* (2006.01)
*H04W 76/14* (2018.01)

(52) U.S. Cl.
CPC ........... *G01S 5/0072* (2013.01); *H04W 76/14* (2018.02)

(58) Field of Classification Search
CPC .............................. H04W 76/14; H04W 76/00
USPC ...................................................... 455/456.1
See application file for complete search history.

(56) References Cited

U.S. PATENT DOCUMENTS

| | | | | |
|---|---|---|---|---|
| 8,370,054 B2 * | 2/2013 | Crady | .................. | G05D 1/0287 |
| | | | | 701/453 |
| 9,794,753 B1 * | 10/2017 | Stitt | .................... | H04W 12/069 |
| 9,838,838 B2 * | 12/2017 | Rhee | ........................ | G01S 19/51 |
| 9,860,868 B2 * | 1/2018 | Smith | .................... | H04W 4/90 |
| 10,237,688 B2 * | 3/2019 | Smith | .................... | H04W 4/025 |
| 12,326,507 B2 * | 6/2025 | Fischer | ................. | H04W 24/08 |
| 2008/0004798 A1 * | 1/2008 | Troxler | ............... | G08B 21/023 |
| | | | | 702/187 |
| 2009/0042557 A1 * | 2/2009 | Vardi | .................... | H04W 72/02 |
| | | | | 455/422.1 |
| 2011/0191279 A1 * | 8/2011 | Kim | ........................ | G06N 5/04 |
| | | | | 706/46 |
| 2011/0269477 A1 * | 11/2011 | Annamalai | ........... | H04W 64/00 |
| | | | | 455/456.1 |

(Continued)

OTHER PUBLICATIONS

Extended European Search Report of Application No. 23176100. 8-1213, dated on Oct. 27, 2023, (9p).

(Continued)

*Primary Examiner* — Marceau Milord

(74) *Attorney, Agent, or Firm* — Arch & Lake LLP; Hao Tan; Shen Wang

(57) ABSTRACT

A locating method applied to a first device configured with a first locating process, includes: transmitting, through the first locating process, a locating request to a second locating process of a second device, in which the first locating process and the second locating process establish a communication connection, through a first link, the first link includes a communication link between the first device and the second device; and receiving, through the first locating process, a locating result transmitted by the second locating process, in which the locating result is determined, through a locating chip, by the second device.

15 Claims, 4 Drawing Sheets in response to first link being established between first device and second device, first intrinsic identification is transmitted, through first locating process, to second locating process, herein first intrinsic identification is an intrinsic identification of first device — S301 locating identification and second intrinsic identification transmitted by second locating process are received and stored, herein locating identification is determined by second device for first device, and second intrinsic identification is an intrinsic identification of second device — S302

(56) References Cited

U.S. PATENT DOCUMENTS

| | | | | |
|---|---|---|---|---|
| 2012/0083241 A1* | 4/2012 | Annamalai | | H04W 4/023 |
| | | | | 455/456.1 |
| 2013/0021199 A1* | 1/2013 | Fix | | G01S 5/021 |
| | | | | 342/357.43 |
| 2013/0217333 A1* | 8/2013 | Sprigg | | G06Q 30/02 |
| | | | | 455/41.2 |
| 2014/0188990 A1* | 7/2014 | Fulks | | H04L 65/403 |
| | | | | 709/204 |
| 2014/0349673 A1* | 11/2014 | Youssef | | H04W 64/00 |
| | | | | 455/456.1 |
| 2015/0281884 A1* | 10/2015 | Smith | | G01S 19/13 |
| | | | | 455/456.3 |
| 2016/0360354 A1* | 12/2016 | Rhee | | H04M 1/72412 |
| 2016/0373881 A1* | 12/2016 | Li | | H04W 72/02 |
| 2017/0039594 A1* | 2/2017 | Shaw | | G06Q 50/01 |
| 2017/0046683 A1* | 2/2017 | Shaw | | G06Q 20/3224 |
| 2017/0079008 A1* | 3/2017 | Smith | | G01S 19/48 |
| 2017/0180938 A1* | 6/2017 | Smith | | H04W 4/08 |
| 2017/0238136 A1* | 8/2017 | Smith | | H04M 1/72457 |
| | | | | 455/456.3 |
| 2017/0339516 A1* | 11/2017 | Edge | | H04W 4/02 |
| 2019/0265222 A1* | 8/2019 | Troxler | | G01N 9/00 |
| 2020/0267683 A1* | 8/2020 | Edge | | G01S 13/767 |
| 2021/0377906 A1* | 12/2021 | Bao | | G01S 5/0205 |
| 2021/0410103 A1* | 12/2021 | Zhang | | H04W 92/18 |
| 2022/0120841 A1* | 4/2022 | Fischer | | H04W 24/08 |
| 2022/0353843 A1* | 11/2022 | Bao | | H04W 64/003 |
| 2023/0087414 A1* | 3/2023 | Opshaug | | G01S 5/08 |
| | | | | 455/456.1 |
| 2023/0095932 A1* | 3/2023 | Ye | | G01S 5/014 |
| | | | | 455/440 |
| 2024/0089370 A1* | 3/2024 | Smith-Rose | | H04M 3/42348 |
| 2025/0220113 A1* | 7/2025 | Smith-Rose | | H04M 3/42042 |

OTHER PUBLICATIONS

First Office Action issued in EP Application No. 23176100.8 dated Dec. 12, 2025, (6p).

The Wayback Machine—https://web.archive.org/web/20151105075735/http://xiaomi.eu:80/community/threads/mipad-blu..."miPAD + bluetooth GPS receiver," (5p).

The Wayback Machine—https://web.archive.org/web/20151127062053/http://android.stackexchange.com:80/questions/117431/gps-for-wifi-only-mipad, GPS for WIFI only MiPad, (4p).

* cited by examiner

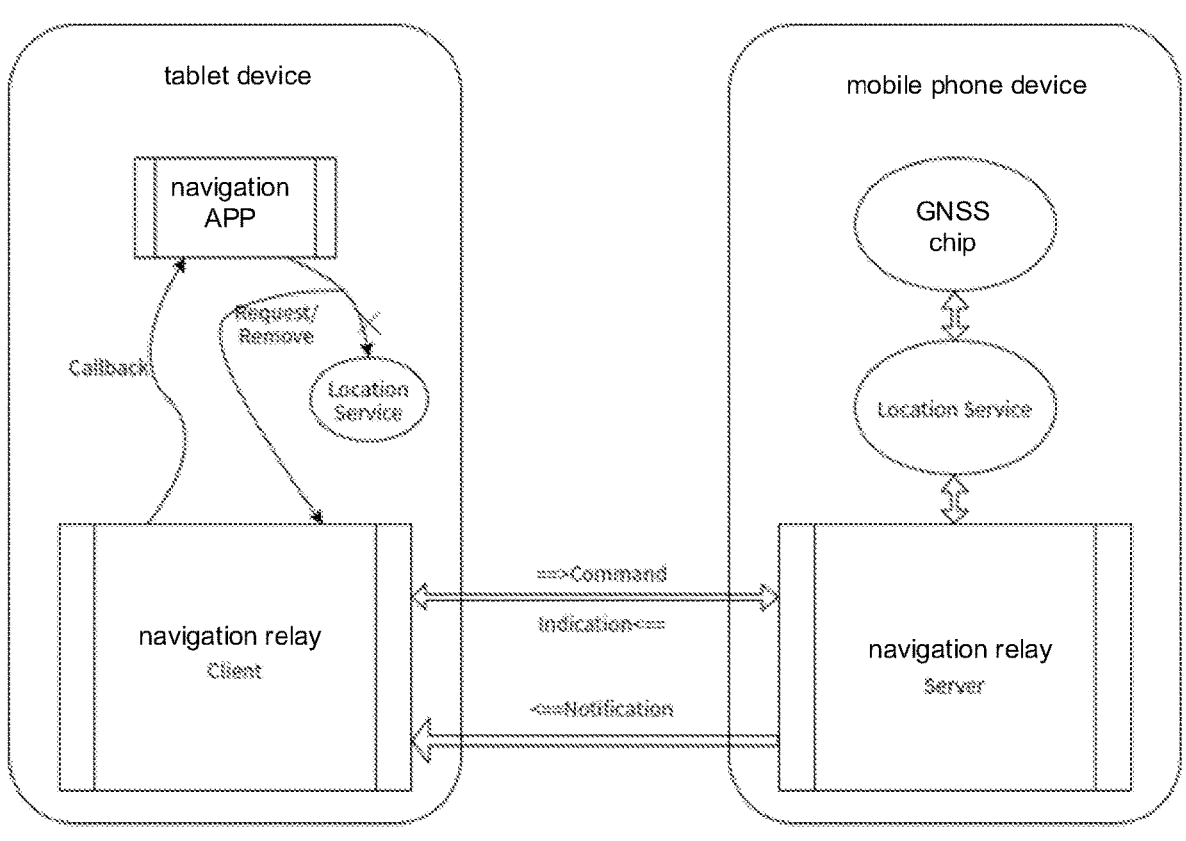

FIG. 1

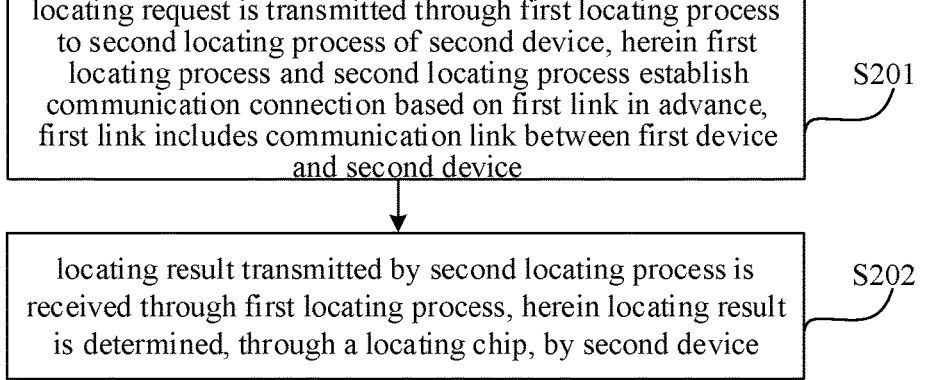

locating request is transmitted through first locating process
to second locating process of second device, herein first
locating process and second locating process establish
communication connection based on first link in advance,
first link includes communication link between first device
and second device                                                    S201 locating result transmitted by second locating process is
received through first locating process, herein locating result
is determined, through a locating chip, by second device         S202

FIG. 2

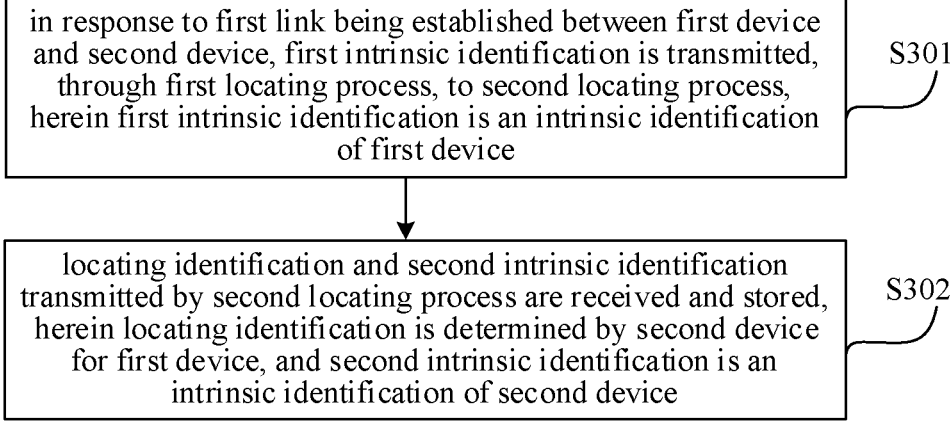

in response to first link being established between first device and second device, first intrinsic identification is transmitted, through first locating process, to second locating process, herein first intrinsic identification is an intrinsic identification of first device                S301 locating identification and second intrinsic identification transmitted by second locating process are received and stored, herein locating identification is determined by second device for first device, and second intrinsic identification is an intrinsic identification of second device                S302

FIG. 3

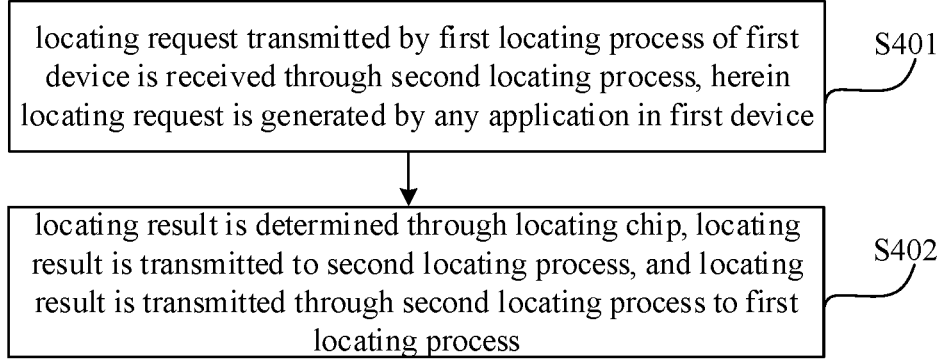

locating request transmitted by first locating process of first device is received through second locating process, herein locating request is generated by any application in first device                S401 locating result is determined through locating chip, locating result is transmitted to second locating process, and locating result is transmitted through second locating process to first locating process                S402

FIG. 4

LOCATING METHOD AND APPARATUS, ELECTRONIC DEVICE, AND STORAGE MEDIUM

CROSS-REFERENCE TO RELATED APPLICATION

This application is based on and claims priority to Chinese Patent Application No. 202310004853.1 filed on Jan. 3, 2023, the disclosure of which is hereby incorporated by reference in its entirety for all purposes.

BACKGROUND

In recent years, the variety of terminal devices has become increasingly diversified, such as common smart phones, wearable devices, tablet computers, etc. There are some differences in hardware configurations of these terminal devices due to their usage scenarios. For example, smart phones and wearable devices are often carried by users, these devices need to be installed with hardware such as locating chips (such as GNSS chip) and Near Field Communication (NFC) modules in order to meet the locating requirements of users; and tablet computers are often used by users in indoor environments, such that these devices often are not installed with hardware such as locating chips and Near Field Communication modules. The above hardware configuration manners are reasonable, however, in the related technologies, if devices such as tablet computers, etc. are used for navigation, the navigation cannot be completed because of lacking locating chips, which results in the users' experience needs to be improved.

SUMMARY

The present disclosure relates to the field of terminal device technologies, and more specifically, to a locating method and apparatus, an electronic device, and a storage medium, so as to solve the defects in the related technologies.

According to a first aspect of the present disclosure, there is provided a locating method, applied to a first device configured with a first locating process in advance; the method including:

transmitting, through the first locating process, a locating request to a second locating process of a second device, in which the first locating process and the second locating process establish, a communication connection through a first link, and the first link includes a communication link between the first device and the second device; and receiving, through the first locating process, a locating result transmitted by the second locating process, in which the locating result is determined, through a locating chip, by the second device.

According to a second aspect of the present disclosure, there is provided a locating method, applied to a second device having a locating chip and being configured with a second locating process in advance, including:

receiving, through the second locating process, a locating request transmitted by a first locating process of a first device, in which the locating request is generated by any application in the first device; and determining, through the locating chip, a locating result, and transmitting the locating result to the second locating process, and transmitting, through the second locating process, the locating result to the first locating process.

According to a third aspect of the present disclosure, there is provided a locating apparatus, applied to a first device configured with a first locating process in advance, including:

a processor; and a memory for storing instructions executable by the processor;

in which the processor is configured to:

transmitting, through the first locating process, a locating request to a second locating process of a second device, in which the first locating process and the second locating process establish, a communication connection through a first link, and the first link includes a communication link between the first device and the second device; and receiving, through the first locating process, a locating result transmitted by the second locating process, in which the locating result is determined, through a locating chip, by the second device.

According to a fourth aspect of the present disclosure, there is provided a locating apparatus, applied to a second device having a locating chip and being configured with a second locating process in advance, including:

a processor; and a memory for storing instructions executable by the processor;

in which the processor is configured to implement the locating method according to the second aspect.

According to a fifth aspect of the present disclosure, there is provided a computer-readable storage medium having stored thereon a computer program which, when executed by a processor, implements the method described in the first aspect.

BRIEF DESCRIPTION OF THE DRAWINGS

The accompanying drawings, which are incorporated in and constitute a part of the description, illustrate embodiments/examples consistent with the present disclosure and, together with the description, serve to explain the principles of the present disclosure.

FIG. 1 is a schematic diagram of a scenario for a locating method according to an example of the present disclosure;

FIG. 2 is a flowchart of a locating method applied to a first device according to an example of the present disclosure;

FIG. 3 is a flowchart of a method for establishing a communication connection between a first locating process and a second locating process according to an example of the present disclosure;

FIG. 4 is a flowchart of a locating method applied to a second device according to an example of the present disclosure;

DETAILED DESCRIPTION

Figure 5:
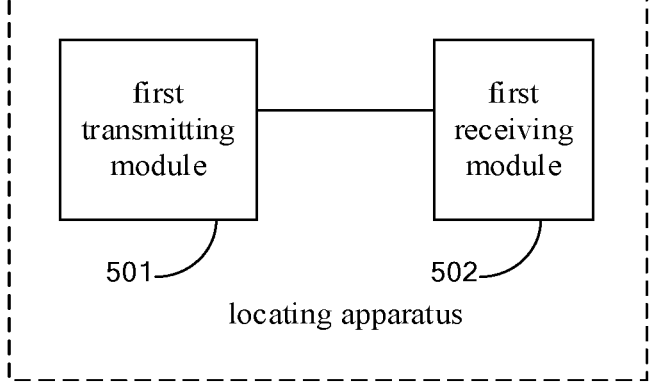
FIG. 5 is a schematic diagram of structure of a locating apparatus applied to a first device according to an example of the present disclosure.

Description will now be made in detail to examples, examples of which are illustrated in the accompanying drawings. The following description refers to the accompanying drawings in which the same numbers in different drawings represent the same or similar elements unless otherwise indicated. The implementations in the following description of examples do not represent all implementations consistent with the present disclosure. Instead, they are merely examples of apparatuses and methods consistent with some aspects of the present disclosure as detailed in the appended claims.

The terminology used in the present disclosure is for the purpose of describing specific embodiments only and is not intended to limit the present disclosure. The singular forms "a/an", "said" and "the" used in the present disclosure and the appended claims are also intended to include the plural forms, unless the context clearly indicates other meaning. In some embodiments of the present disclosure, the term "and/or" as used herein refers to and includes any or all possible combinations of one or more associated listed items.

In some embodiments of the present disclosure, although the terms "first", "second", "third", etc. can be used to describe various types of information in the present disclosure, these information should not be limited to these terms. These terms are only used to distinguish the same type of information from each other. For example, without departing from the scope of the present disclosure, the first information can also be called the second information, and similarly, the second information can also be called the first information. Depending on the context, the word "if" as used herein can be interpreted as "when . . . " or "at the time of . . . " or "in response to a determination".

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

In recent years, the variety of terminal devices has become increasingly diversified, such as common smart phones, wearable devices, tablet computers etc. There are some differences in hardware configurations of these terminal devices due to their usage scenarios. For example, smart phones and wearable devices are often carried by users, these devices need to be installed with hardware such as locating chips (such as GNSS chip) and Near Field Communication (NFC) modules in order to meet the locating needs of users; whereas tablet computers are often used by users in indoor environments, thus these devices often are not installed with hardware such as locating chips and Near Field Communication modules. The above hardware configuration manners are reasonable, however, in the related technologies, if devices such as tablet computers, etc. are used for navigation, the navigation cannot be completed because of lacking locating (or positioning) chips, which results in that the users' experience needs to be improved.

On this basis, at least one embodiment of the present disclosure provides a locating (or positioning) method, this method can be completed by the cooperation of a first device and a second device, in which the first device can be a device without a locating chip, the second device can be a device with a locating chip, that is, the first device can complete locating with the help of the second device. Exemplarily, the first device can be a tablet computer, and the second device can be a smart phone.

The first device is configured with a first locating process in advance, that is, a client terminal executing the method, the second device is configured with a second locating process in advance, that is, a server terminal executing the method, the first locating process and the second locating process establish a communication connection through a first link, the first link includes a communication link between the first device and the second device, and the first link can be a communication link of a wireless network. For example, the first device is connected with the hotspot of the wireless network of the second device, so as to establish a communication link of the wireless network between them. The first link can also be a Bluetooth communication link, for example, a Bluetooth communication link is formed between the first device and the second device after the Bluetooth connection is established between them.

Please refer to FIG. 1, a scenario of this method is illustrated. The first device is a tablet device, and the second device is a mobile phone device. The tablet device is pre-configured with a navigation relay Client (that is, the first locating process), the tablet device is installed with a navigation APP, the tablet device further includes a Location Service, the mobile phone device is pre-configured with a navigation relay server (that is, the second locating process), and the mobile phone device further includes a locating service (Location Service) and a GNSS chip (that is, the locating chip).

The navigation APP in the tablet device can disconnect a connection with the Location Service and establish a link with the navigation relay Client, the navigation APP can transmit a locating request (Request) to the navigation relay Client; the navigation relay Client can transmit a locating command (Command) to the navigation relay Server; the navigation relay Server can transmit a locating request to the Location Service after receiving the locating command, the Location Service receives a position indication reported by GNSS after activating the GNSS chip, the Location Service transmits the position indication reported by GNSS to the navigation relay Server, the navigation relay Server transmits the position indication (Indication) to the navigation relay Client, the navigation APP has registered a listener in the navigation relay Client, and the navigation relay Client puts the position into the listener registered by the navigation APP in the navigation relay Client, such that the navigation APP calls back the position from the listener and completes the locating.

The navigation APP can remove a locating request from the navigation relay Client when there is no locating request, the navigation relay Client can transmit a locating cancellation command to the navigation relay Server, the navigation relay Server can remove the locating request from the Location Service after receiving the locating cancellation command, the Location Service turns off the GNSS chip, and the navigation relay Server transmits a locating cancellation notification to the navigation relay Client.

Next, the locating method of the present disclosure is introduced from two aspects, namely the first device and the second device.

In the first aspect, please refer to FIG. 2, a flow of a locating method applied to a first device, including steps S201 to S202, is illustrated exemplarily.

In step S201, a locating request is transmitted through the first locating process to a second locating process of a second device, in which the first locating process and the second locating process establish a communication connection based on a first link in advance, the first link includes a communication link between the first device and the second device.

Exemplarily, in response to a locating request generated by any application in the terminal device, the locating request can be transmitted to the first locating process, and the locating request can be transmitted through the first locating process to the second locating process. For example, when a map program executes a navigation function, a locating request is generated, and the locating request can be transmitted to a first locating process, and transmitted to a second locating process through the first locating process. In addition, after the application generates the locating request, prompt information can be generated, the prompt information is used for asking the user whether the first locating process can be used for locating, and the locating request can be transmitted to the first locating process if the user's confirmation operation is received.

In some embodiments of the present disclosure, the first device can transmit a locating identification and a second intrinsic identification to the second locating process of the second device through the first locating process, while transmitting a locating request to the second locating process of the second device through the first locating process, in which the locating identification is determined by the second device for the first device, the second intrinsic identification is an intrinsic identification of the second device, such as OAID of the second device, the OAID is a character string with the maximum length of 64.

After receiving the locating request transmitted by the first device, the second device can determine a locating result through the locating chip, transmit the locating result to the second locating process, and transmit the locating result to the first locating process through the second locating process. Exemplarily, the second device can be provided with a connecting device library and a locating device library. The locating device library is used for storing a device identification to which the first locating process that has established communication connection with the second locating process belongs, that is, the intrinsic identification of the device and the locating identification allocated by the second device; and the connecting device library is used for storing the identification of the device that currently has a locating request (that is, the device that needs the second device to provide a locating result), that is, the locating identification of the device. Thus, after receiving the locating request, the locating identification, and the intrinsic identification transmitted by the first device, the second device can determine whether the received intrinsic identification is the second intrinsic identification, that is, whether it is the second device's intrinsic identification, and transfer the locating identification from the connecting device library to the locating device library if the received intrinsic identification is the second intrinsic identification. Next, the second device will transmit, through the second locating process, the locating result to the first locating process of the first device to which the locating identification in the locating device library corresponds. That is to say, the second device will verify whether the first device is a legal device after receiving the locating request of the first device, and it will return the locating result to the first device if the first device is a legal device, thereby improving security and stability of the method.

Exemplarily, the second locating process can initiate a locating request to a Location Service of the second device, the Location Service enables a locating chip, the locating chip reports a locating result to the Location Service after determining the locating result, the Location Service reports the locating result to the second locating process, and the second locating process will transmit the locating result to the first locating process after receiving the locating result every time.

In step S202, a locating result transmitted by the second locating process is received through the first locating process, in which the locating result is determined, through a locating chip, by the second device.

Since the locating request is generated by an application of the first device, after the locating result transmitted by the second locating process is received through the first locating process, in response to the first locating process has received a locating result, the locating result can be transmitted to the application generating the locating request. Exemplarily, the application generating a locating request can register a listener in the first locating process, and the first locating process can transmit the locating result to the listener of the application after receiving the locating result, such that the application can obtain the locating result.

In addition, a locating cancellation request and a locating identification can be transmitted to the second locating process through the first locating process in response to that no application in the first device has a locating request; and a locating cancellation notification transmitted by the second locating process is received, in which the locating cancellation notification is generated by the second device after the locating function is deactivated. After receiving the locating cancellation request and the locating identification transmitted by the first locating process, the second device can transfer the locating identification to the connecting device library from the locating device library, and transmit a locating cancellation notification to the first locating process through the second locating process. In some embodiments of the present disclosure, if there is no locating identification in the locating device library, the second device can control the locating chip to stop locating, exemplarily, the second locating process can remove the locating request from the Location Service of the second device, and the Location Service will deactivate the locating chip, so as to stop locating.

In the locating method provided by embodiments of the present disclosure, a communication link exists between the first device and the second device, a communication connection based on the aforesaid communication link is established between the first locating process of the first device and the second locating process of the second device, such that the first device can transmit, through the first locating process, a locating request to the second locating process of the second device, and the second device can complete locating by using the locating chip after receiving the locating request, determine a locating result, and return, through the second locating process, the locating result to the first locating process, that is, the first device can receive, through the first locating process, the locating result transmitted by the second locating process, thereby the first device having no locating chip can also complete locating. This method can expand the functions of devices such as tablet computers, such that they can also perform navigation functions even if having no locating chip, and improve the user experience.

In some embodiments of the present disclosure, the first device can establish a communication connection between the first locating process and the second locating process in the manner shown in FIG. 3, including steps S301 to S302.

In step S301, in response to the first link being established between the first device and the second device, the first intrinsic identification is transmitted, through the first locating process, to the second locating process, in which the first intrinsic identification is an intrinsic identification of the first device.

Herein, the first link can be a wireless network communication link or a Bluetooth communication link. The first intrinsic identification can be OAID of the first device, and the OAID is a string with a maximum length of 64.

In some embodiments of the present disclosure, it can also be determined whether the first device has a locating function, it can be determined that the first device is a client terminal when the first device does not have a locating function, it can be determined that the first device is a server terminal when the first device has a locating function, and step S201 is an initiating step for the client terminal to establish a communication connection to the server terminal, and thus the step S201 is executed only when the first device is a client terminal, that is, in response to the first link being established between the first device and the second device and that the first device does not have a locating function, through the first locating process, the first intrinsic identification is transmitted to the second locating process. When determining whether the first device has a locating function, it can be determined whether the first device supports satellite locating and whether it enables gps provlDer. If neither satellite locating is supported nor gps provlDer is enabled, it can be determined that the first device does not have a locating function.

The second device can be provided with a connecting device library, used for storing the device identification to which the first locating process that has established a communication connection with the second locating process belongs, that is, the intrinsic identification of the device and the locating identification allocated by the second device. Thus, the second device can determine whether there is a locating identification to which the first intrinsic identification corresponds in its connecting device library, after receiving, through the second locating process, the first intrinsic identification transmitted by the first locating process, and transmits, through the second locating process, to the first locating process, the locating identification to which the first intrinsic identification corresponds and the second intrinsic identification, when there is a locating identification to which the first intrinsic identification corresponds in the connecting device library, in which the second intrinsic identification is an intrinsic identification of the second device; when there is no the locating identification to which to the first intrinsic identification corresponds in the connection device library, the second device can determine the locating identification to which the first intrinsic identification corresponds, add the locating identification to which the first intrinsic identification corresponds into the connection device library, and transmit, through the second locating process, the locating identification to which the first intrinsic identification corresponds and the second intrinsic identification to the first locating process.

In step S302, a locating identification and a second intrinsic identification transmitted by the second locating process are received and stored, in which the locating identification is determined by the second device for the first device, and the second intrinsic identification is an intrinsic identification of the second device.

After this step is completed, a communication connection is established between the first locating process of the first device and the second locating process of the second device, such that a communication connection can be established between the application with a locating requirement and the first locating process, thereby the first locating process instead of the Location Service can establish a link with the application, and as such when the application generates a locating request, the application can transmit the locating request to the first locating process instead of the Location Service.

In some embodiments of the present disclosure, the communication connection between the first locating process and the second locating process will consume the power of the two devices in real time, and thus it can be further determined whether the application in the first device has a locating request; in response to that no application in the first device has a locating request, the communication connection between the first locating process and the second locating process can be disconnected, thereby reducing the power consumption of the two devices; in response to that a locating request is generated by any application in the first device, a communication connection can be established between the first locating process and the second locating process based on the first link, thereby facilitating transmitting, by the first locating process, the locating request, the first intrinsic identification and the locating identification to the second locating process. That is to say, after the communication connection between the first locating process and the second locating process is successfully established in this embodiment, the communication connection between the first locating process and the second locating process can be controlled according to the locating requirement of the first device, such that the power consumption of the two devices can be reduced and the locating requirement of the first device can be met at the same time.

In the second aspect, please refer to FIG. 4, a flow of a locating method applied to a second device, including steps S401 to S402, is illustrated exemplarily.

In step S401, a locating request transmitted by a first locating process of a first device is received through the second locating process, in which the locating request is generated by any application in the first device.

In step S402, a locating result is determined through the locating chip, the locating result is transmitted to the second locating process, and the locating result is transmitted through the second locating process to the first locating process.

Exemplarily, the second locating process can initiate a locating request to a Location Service of the second device, the Location Service enables a locating chip, the locating chip reports a locating result to the Location Service after determining the locating result, the Location Service reports the locating result to the second locating process, and the second locating process will transmit the locating result to the first locating process after receiving the locating result every time.

Exemplarily, the second device can transfer the locating identification to the locating device library from the connecting device library, in response to receiving the locating request and the locating identification transmitted by the first locating process of the first device. Exemplarily, the second device can determine whether a received intrinsic identification is the second intrinsic identification in response to receiving the locating request, the locating identification, and the intrinsic identification transmitted by the first locating process of the first device; and can transfer the locating identification to the locating device library from the connecting device library when the received intrinsic identification is the second intrinsic identification. That is to say, the second device will verify whether the first device is a legal device after receiving the locating request of the first device, and it will return the locating result to the first device if the first device is a legal device, thereby improving security and stability of the method.

Based on the above examples, in this step, the locating result can be transmitted, through the second locating process, to the first locating process of the first device to which the locating identification in the locating device library corresponds.

In addition, the first device can transmit, through the first locating process, a locating cancellation request and a locating identification to the second locating process, in response to that no application in the first device has a locating request; the second device can receive, through the second locating process, the locating cancellation request and locating identification transmitted by the first locating process of the first device, transfer the locating identification to the connecting device library from the locating device library, and transmit, through the second locating process, a locating cancellation notification to the first locating process; and the first device can receive, through the first locating process, the locating cancellation notification transmitted by the second locating process. In some embodiments of the present disclosure, the second device can control the locating chip to stop locating if there is no locating identification in the locating device library. Exemplarily, the second locating process can remove the locating request from the Location Service of the second device, and the Location Service will deactivate the locating chip to stop locating.

In some embodiments of the present disclosure, the second device can establish a communication connection between the first locating process and the second locating process in advance as follows.

First, the first intrinsic identification transmitted by the first locating process is received by the second locating process, in which the first intrinsic identification is an intrinsic identification of the first device.

Next, when a locating identification to which the first intrinsic identification corresponds is present in a connecting device library, the locating identification to which the first intrinsic identification corresponds and the second intrinsic identification are transmitted through the second locating process to the first locating process, in which the second intrinsic identification is an intrinsic identification of the second device.

Last, when a locating identification to which the first intrinsic identification corresponds is not present in the connecting device library, a locating identification to which the first intrinsic identification corresponds is determined, and the locating identification to which the first intrinsic identification corresponds is added into the connecting device library, and the locating identification to which the first intrinsic identification corresponds and the second intrinsic identification are transmitted to the first locating process through the second locating process.

The details of respective steps in the second aspect have been introduced in detail in the first aspect, and will not be repeated here.

According to a third aspect of embodiments of the present disclosure, there is provided a locating apparatus, applied to a first device, and the first device is configured with a first locating process in advance; please refer to FIG. 5, the apparatus includes:

a first transmitting module 501 configured to transmit, through the first locating process, a locating request to a second locating process of a second device, in which the first locating process and the second locating process establish, through a first link, a communication connection, and the first link includes a communication link between the first device and the second device; and a first receiving module 502 configured to receive, through the first locating process, a locating result transmitted by the second locating process, in which the locating result is determined, through a locating chip, by the second device.

In some embodiments, the first transmitting module is specifically configured to perform:

in response to a locating request generated by any application in the first device, transmitting the locating request to the first locating process and transmitting, through the first locating process, the locating request to the second locating process;

the apparatus further includes a second transmitting module, which is configured to perform:

in response to that the first locating process has received a locating result, transmitting the locating result to an application generating the locating request.

In some embodiments, the apparatus further includes a first communicating module, which is configured to perform:

in response to the first link being established between the first device and the second device, transmitting, through the first locating process, the first intrinsic identification to the second locating process, in which the first intrinsic identification is an intrinsic identification of the first device; and receiving and storing a locating identification and a second intrinsic identification transmitted by the second locating process, in which the locating identification is determined by the second device for the first device, and the second intrinsic identification is an intrinsic identification of the second device.

In some embodiments, the transmitting module is specifically configured to perform:

transmitting, through the first locating process, the locating request, the locating identification and the second intrinsic identification to a second locating process of a second device.

In some embodiments, the locating apparatus further includes a determining module, which is configured to perform:

determining whether the first device has a locating function; and when the communicating module is configured to perform, in response to the first link being established between the first device and the second device, transmitting, through the first locating process, the first intrinsic identification to the second locating process, the communicating module is specifically configured to perform:

in response to the first link being established between the first device and the second device and that the first device does not have a locating function, transmitting, through the first locating process, the first intrinsic identification to the second locating process.

In some embodiments, the locating apparatus further includes a connecting module, which is configured to perform, after receiving and storing a locating identification and a second intrinsic identification transmitted by the second locating process, establishing a communication connection between an application with a locating requirement and the first locating process.

In some embodiments, the apparatus further includes a connecting/disconnecting module, which is configured to perform:

in response to that no application in the first device has a locating request, disconnecting the communication connection between the first locating process and the second locating process; and/or, in response to that a locating request is generated by any application in the first device, establishing, based on the first link, a communication connection between the first locating process and the second locating process.

In some embodiments, the apparatus further includes a first cancelling module, which configured to perform:

in response to that no application in the first device has a locating request, transmitting, through the first locating process, a locating cancellation request to the second locating process; and receiving a locating cancellation notification transmitted by the second locating process, in which the locating cancellation notification is generated by the second device after a locating function is deactivated.

Figure 6:
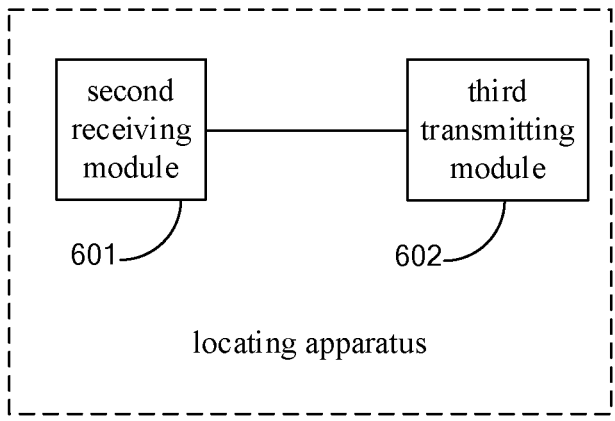
FIG. 6 is a schematic diagram of structure of a locating apparatus applied to a second device according to an example of the present disclosure.

According to a fourth aspect of the embodiments of the present disclosure, there is provided a locating apparatus, applied to a second device, and the second device has a locating chip and is configured with a second locating process; please refer to FIG. 6, the apparatus including:

a second receiving module 601 configured to receive, through the second locating process, a locating request transmitted by a first locating process of a first device, in which the locating request is generated by any application in the first device; and a third transmitting module 602 configured to determine a locating result, through the locating chip, transmit the locating result to the second locating process, and transmit the locating result, through the second locating process, to the first locating process.

In some embodiments, the locating apparatus further includes a second communicating module, which is configured to perform:

receiving, through the second locating process, a first intrinsic identification transmitted by the first locating process, in which the first intrinsic identification is an intrinsic identification of the first device;

when a locating identification to which the first intrinsic identification corresponds is present in a connecting device library, transmitting, through the second locating process, the locating identification to which the first intrinsic identification corresponds and the second intrinsic identification to the first locating process, in which the second intrinsic identification is an intrinsic identification of the second device; and when a locating identification to which the first intrinsic identification corresponds is not present in the connecting device library, determining a locating identification to which the first intrinsic identification corresponds, and adding the locating identification to which the first intrinsic identification corresponds into the connecting device library, and transmitting, through the second locating process, the locating identification to which the first intrinsic identification corresponds and the second intrinsic identification to the first locating process.

In some embodiments, the locating apparatus further includes a transferring module, which is configured to perform:

in response to receiving a locating request and a locating identification transmitted by a first locating process of a first device, transferring the locating identification into a locating device library from a connecting device library;

when the third transmitting module is configured to transmit, through the second locating process, the locating result to the first locating process, the third transmitting module is specifically configured to perform:

transmitting, through the second locating process, the locating result to the first locating process of the first device to which the locating identification in the locating device library corresponds.

In some embodiments, the transferring module is specifically configured to perform:

in response to receiving a locating request, a locating identification and an intrinsic identification transmitted by a first locating process of a first device, determining whether a received intrinsic identification is the second intrinsic identification; and when the received intrinsic identification is the second intrinsic identification, transferring the locating identification into the locating device library from the connecting device library.

In some embodiments, the locating apparatus further includes a second cancelling module, which is configured to perform:

receiving, through the second locating process, a locating cancellation request and a locating identification transmitted by a first locating process of a first device; and transferring the locating identification to the connecting device library from the locating device library, and transmitting, through the second locating process, a locating cancellation notification to the first locating process.

The specific manners in which operations are executed by the respective modules in the apparatus of the above embodiments have been described in detail in the first aspect, and will not be repeated here.

Figure 7:
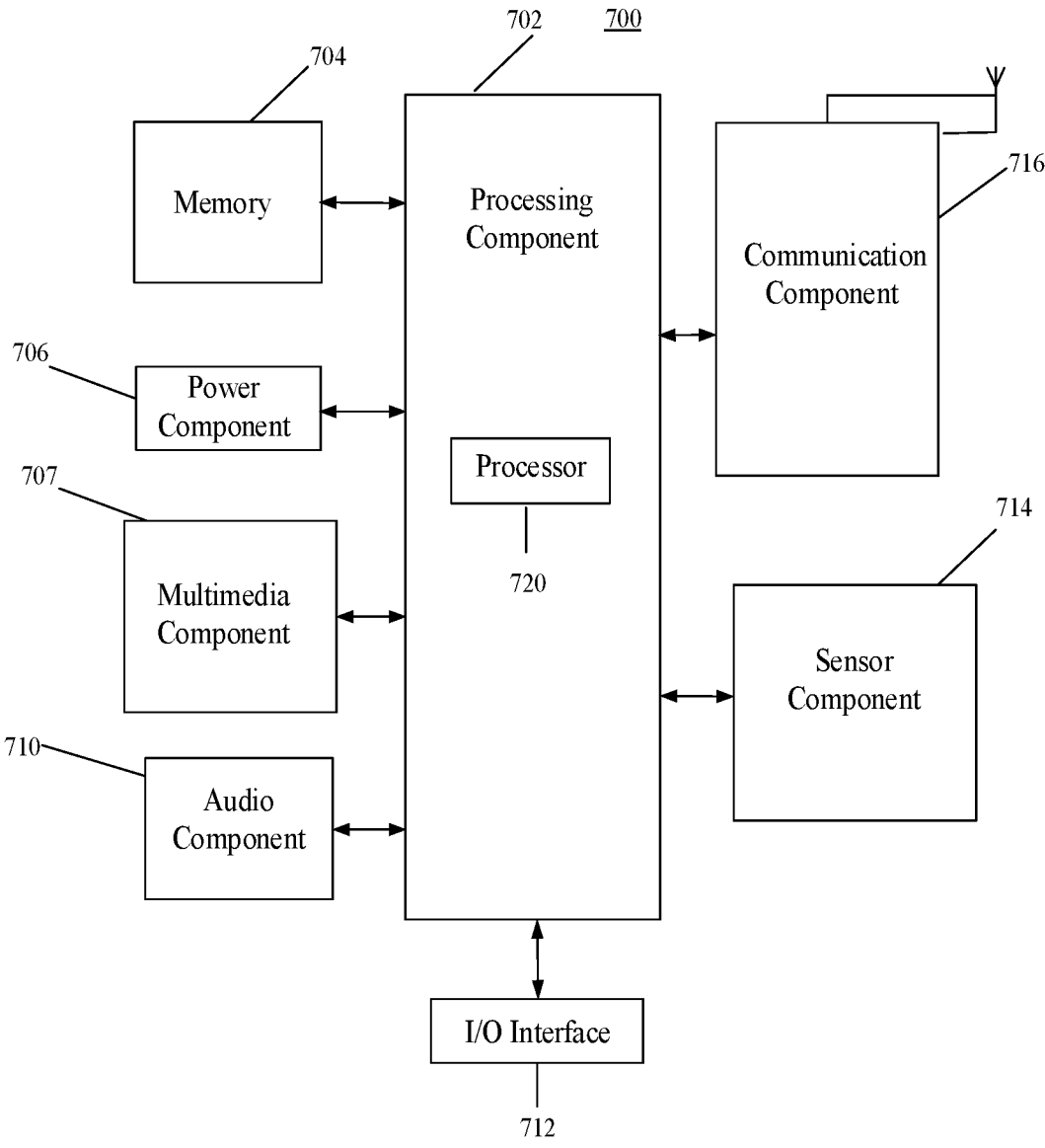
FIG. 7 is a block diagram of structure of an electronic device according to an example of the present disclosure.

According to a fifth aspect of embodiments of the present disclosure, please refer to FIG. 7, which exemplarily shows a block diagram of an electronic device. For example, the device 700 can be a mobile phone, a computer, a digital broadcast terminal, a messaging device, a gaming console, a tablet, a medical device, exercise equipment, a personal digital assistant, and the like.

Referring to FIG. 7, the device 700 can include one or more of the following components: a processing component 702, a memory 704, a power component 706, a multimedia component 707, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 can include one or more processors 720 to execute instructions to perform all or part of the steps in the above described methods. Moreover, the processing component 702 can include one or more modules which facilitate the interaction between the processing component 702 and other components. For instance, the processing component 702 can include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 can include a power management system, one or more power sources, and any other components associated with the generation, management, and distribution of power in the device 700.

The multimedia component 708 includes a screen providing an output interface between the device 700 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 708 includes a front camera and/or a rear camera. The front camera and the rear camera can receive an external multimedia datum while the device 700 is in an operation mode, such as a photographing mode or a video mode. Each of the front camera and the rear camera can be a fixed optical lens system or have focus and optical zoom capability.

The audio component 710 is configured to output and/or input audio signals. For example, the audio component 710 includes a microphone ("MIC") configured to receive an external audio signal when the device 700 is in an operation mode, such as a call mode, a recording mode, and a voice recognition mode. The received audio signal can be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons can include, but are not limited to, a home button, a volume button, a starting button, and a locking button.

The sensor component 714 includes one or more sensors to provide status assessments of various aspects of the device 700. For instance, the sensor component 714 can detect an open/closed status of the device 700, relative locating of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 can include a proximity sensor configured to detect the presence of nearby objects without any physical contact. The sensor component 714 can also include a light sensor, such as a CMOS or CCD image sensor, for use in imaging applications. In some embodiments, the sensor component 714 can also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 can access a wireless network based on a communication standard, such as Wi-Fi, 2G, 3G, 4G, 5G or a combination thereof. In one example, the communication component 716 receives a broadcast signal or broadcast associated information from an external broadcast management system via a broadcast channel. In one example, the communication component 716 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In examples, the device 700 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described locating methods of the electronic device.

In a sixth aspect, in examples, there is also provided a non-transitory computer-readable storage medium including instructions, such as included in the memory 704, executable by the processor 720 in the device 700, for performing the above described locating methods of the electronic device. For example, the non-transitory computer-readable storage medium can be a ROM, a RAM, a CD-ROM, a magnetic tape, a floppy disc, an optical data storage device, and the like.

The technical solutions provided by embodiments of the present disclosure can achieve the following advantages:

In the locating method provided by embodiments of the present disclosure, a communication link exists between the first device and the second device, and a communication connection based on the aforesaid communication link is established between the first locating process of the first device and the second locating process of the second device, such that the first device can transmit, through the first locating process, a locating request to the second locating process of the second device, and the second device can complete locating by using the locating chip after receiving the locating request, determine a locating result, and return, through the second locating process, the locating result to the first locating process, that is, the first device can receive, through the first locating process, the locating result transmitted by the second locating process, thereby the first device having no locating chip can also complete locating. This method can expand the functions of devices such as tablet computers, such that they can also perform navigation functions even if having no locating chip, and improve the user experience.

Other embodiments of the present disclosure can be available to those skilled in the art upon consideration of the specification and practice of the various embodiments disclosed herein. The present application is intended to cover any variations, uses, or adaptations of the present disclosure following general principles of the present disclosure and
including the common general knowledge or conventional
technical means in the art. The specification and embodi-
ments can be shown as illustrative only, and the true scope
and spirit of the present disclosure are indicated by the
following claims.

It will be understood that the present disclosure is not
limited to the exact construction that has been described
above and illustrated in the accompanying drawings, and
that various modifications and changes can be made without
departing from the scope thereof. It is intended that the
scope of the present disclosure is limited only by the
appended claims.

What is claimed is:

1. A locating method, applied to a first device configured
with a first locating process; comprising:
    transmitting, through the first locating process, a locating
        request to a second locating process of a second device,
        wherein the first locating process and the second locat-
        ing process establish a communication connection
        through a first link, the first link comprises a commu-
        nication link between the first device and the second
        device, and the first device is configured to, in response
        to the locating request generated by an application in
        the first device, transmit the locating request to the first
        locating process, and transmit, through the first locating
        process, the locating request to the second locating
        process;
    receiving, through the first locating process, a locating
        result transmitted by the second locating process,
        wherein the locating result is determined, through a
        locating chip, by the second device;
    in response to that the first locating process has received
        the locating result, transmitting the locating result to an
        application generating the locating request;
    in response to establishment of the first link between the
        first device and the second device, transmitting,
        through the first locating process, a first intrinsic iden-
        tification to the second locating process, wherein the
        first intrinsic identification is an intrinsic identification
        of the first device; and
    receiving and storing a locating identification and a sec-
        ond intrinsic identification transmitted by the second
        locating process, wherein the locating identification is
        determined by the second device for the first device,
        and the second intrinsic identification is an intrinsic
        identification of the second device.

2. The locating method according to claim 1, wherein
transmitting, through the first locating process, a locating
request to a second locating process of a second device
comprises:
    transmitting, through the first locating process, the locat-
        ing request, the locating identification and the second
        intrinsic identification to the second locating process of
        the second device.

3. The locating method according to claim 1, further
comprising:
    determining whether the first device has a locating func-
        tion; and
    in response to establishment of the first link between the
        first device and the second device, transmitting,
        through the first locating process, the first intrinsic
        identification to the second locating process comprises:
    in response to establishment of the first link between the
        first device and the second device and that the first
        device does not have a locating function, transmitting, through the first locating process, the first intrinsic
    identification to the second locating process.

4. The locating method according to claim 1, after receiv-
ing and storing a locating identification and a second intrin-
sic identification transmitted by the second locating process,
further comprising:
    establishing a communication connection between an
        application with a locating requirement and the first
        locating process.

5. The locating method according to claim 1, further
comprising:
    in response to that no application in the first device has a
        locating request, disconnecting the communication
        connection between the first locating process and the
        second locating process; and,
    in response to that the locating request is generated by the
        application in the first device, establishing the commu-
        nication connection between the first locating process
        and the second locating process based on the first link.

6. The locating method according to claim 1, further
comprising:
    in response to that no application in the first device has a
        locating request, transmitting, through the first locating
        process, a locating cancellation request to the second
        locating process; and
    receiving a locating cancellation notification transmitted
        by the second locating process, wherein the locating
        cancellation notification is generated by the second
        device after a locating function is deactivated.

7. A computer-readable storage medium, having stored
thereon a computer program which, when executed by a
processor, implements the method according to claim 1.

8. A locating method, applied to a second device having
a locating chip and being configured with a second locating
process, comprising:
    receiving, through the second locating process, a locating
        request transmitted by a first locating process of a first
        device, wherein the locating request is generated by an
        application in the first device;
    determining, through the locating chip, a locating result,
        and transmitting the locating result to the second locat-
        ing process, and transmitting, through the second locat-
        ing process, the locating result to the first locating
        process,
    receiving, through the second locating process, a first
        intrinsic identification transmitted by the first locating
        process, wherein the first intrinsic identification is an
        intrinsic identification of the first device;
    when a locating identification to which the first intrinsic
        identification corresponds is present in a connecting
        device library, transmitting, through the second locat-
        ing process, the locating identification to which the first
        intrinsic identification corresponds and a second intrin-
        sic identification to the first locating process, wherein
        the second intrinsic identification is an intrinsic iden-
        tification of the second device; and
    when a locating identification to which the first intrinsic
        identification corresponds is not present in the connect-
        ing device library, determining a locating identification
        to which the first intrinsic identification corresponds,
        and adding the locating identification to which the first
        intrinsic identification corresponds into the connecting
        device library, and transmitting, through the second
        locating process, the locating identification to which
        the first intrinsic identification corresponds and the
        second intrinsic identification to the first locating pro-
        cess.

9. The locating method according to claim 8, further comprising:

in response to receiving a locating request and a locating identification transmitted by a first locating process of a first device, transferring the locating identification into a locating device library from a connecting device library; and transmitting, through the second locating process, the locating result to the first locating process comprises:

transmitting, through the second locating process, the locating result to the first locating process of the first device to which the locating identification in the locating device library corresponds.

10. The locating method according to claim 9, wherein in response to receiving a locating request and a locating identification transmitted by a first locating process of a first device, transferring the locating identification into a locating device library from a connecting device library comprises:

in response to receiving the locating request, the locating identification and an intrinsic identification transmitted by the first locating process of the first device, determining whether the intrinsic identification received is the second intrinsic identification; and when the intrinsic identification received is the second intrinsic identification, transferring the locating identification into the locating device library from the connecting device library.

11. The locating method according to claim 9, further comprising:

receiving, through the second locating process, a locating cancellation request and the locating identification transmitted by the first locating process of the first device; and transferring the locating identification to the connecting device library from the locating device library, and transmitting, through the second locating process, a locating cancellation notification to the first locating process.

12. A locating apparatus, applied to a second device having a locating chip and being configured with a second locating process, comprising:

a processor; and a memory for storing instructions executable by the processor;

wherein the processor is configured to implementing the locating method according to claim 8.

13. The locating apparatus according to claim 12, wherein the processor is further configured to perform:

in response to receiving a locating request and a locating identification transmitted by a first locating process of a first device, transferring the locating identification into a locating device library from a connecting device library; and transmitting, through the second locating process, to the first locating process of the first device to which the locating identification in the locating device library corresponds, the locating result.

14. A computer-readable storage medium, having stored thereon a computer program which, when executed by a processor, implements the method according to claim 8.

15. A locating apparatus, applied to a first device configured with a first locating process; comprising:

a processor; and a memory for storing instructions executable by the processor;

wherein the processor is configured to transmit, through the first locating process, to a second locating process of a second device, a locating request, wherein the first locating process and the second locating process establish, through a first link, a communication connection, the first link includes a communication link between the first device and the second device, and the processor is configured to, in response to a locating request generated by an application in the first device, transmit the locating request to the first locating process and transmitting, through the first locating process, the locating request to the second locating process;

receive, through the first locating process, a locating result transmitted by the second locating process, wherein the locating result is determined, through a locating chip, by the second device, in response to that the first locating process has received the locating result, transmit the locating result to an application generating the locating request;

in response to establishment of the first link between the first device and the second device, transmit, through the first locating process, to the second locating process, a first intrinsic identification, wherein the first intrinsic identification is an intrinsic identification of the first device; and receive and store a locating identification and a second intrinsic identification transmitted by the second locating process, wherein the locating identification is determined by the second device for the first device, and the second intrinsic identification is an intrinsic identification of the second device.

* * * * *